United States Patent
Shen et al.

(10) Patent No.: US 11,129,064 B2
(45) Date of Patent: Sep. 21, 2021

(54) METHOD OF ACTIVATING AND DEACTIVATING SECONDARY CELL AND TERMINAL DEVICE

(71) Applicant: Guangdong OPPO Mobile Telecommunications Corp., Ltd., Guangdong (CN)

(72) Inventors: Jia Shen, Guangdong (CN); Cong Shi, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 204 days.

(21) Appl. No.: 16/463,834

(22) PCT Filed: Dec. 26, 2017

(86) PCT No.: PCT/CN2017/118703
§ 371 (c)(1),
(2) Date: May 23, 2019

(87) PCT Pub. No.: WO2019/127035
PCT Pub. Date: Jul. 4, 2019

(65) Prior Publication Data
US 2021/0120464 A1    Apr. 22, 2021

(51) Int. Cl.
*H04W 36/00*      (2009.01)
*H04W 28/08*     (2009.01)

(52) U.S. Cl.
CPC ... *H04W 36/0055* (2013.01); *H04W 28/0815* (2020.05); *H04W 36/0069* (2018.08)

(58) Field of Classification Search
CPC ......... H04W 36/0055; H04W 36/0069; H04W 28/0815
See application file for complete search history.

(56) References Cited

U.S. PATENT DOCUMENTS 9,686,779 B2 *   6/2017   Jang ................... H04W 72/042
10,582,403 B2 *  3/2020   Kim .................... H04W 4/029
(Continued)

FOREIGN PATENT DOCUMENTS

| CN | 105637967 A | 6/2016 |
| CN | 107211296 A | 9/2017 |
| WO | 2016168342 A1 | 10/2016 |

OTHER PUBLICATIONS

English translation of CN OA for CN Application No. 201780050612.3 mailed Apr. 27, 2020.
(Continued)

*Primary Examiner* — Magdi Elhag
(74) *Attorney, Agent, or Firm* — Young Basile Hanlon & MacFarlane, P.C.

(57) ABSTRACT

A method of activating and deactivating a secondary cell and a terminal device are provided. The method includes: a terminal device receives first indication information for indicating the terminal device to activate or deactivate a secondary cell of the terminal device sent by network device at a first starting time; the terminal device receives second indication information for indicating the terminal device to activate or deactivate the secondary cell sent by the network device at a second starting time later than the first starting time, herein the terminal device does not accomplish the activation or deactivation of the secondary cell according to the first indication information at the second starting time; after the second starting time, the terminal device determines to activate or deactivate the secondary cell only according to the first indication information or the second indication information, according to a preset rule.

13 Claims, 2 Drawing Sheets

(56) References Cited

U.S. PATENT DOCUMENTS

| | | | | |
|---|---|---|---|---|
| 2012/0207089 A1* | 8/2012 | Kone | ............... | H04L 5/001 |
| | | | | 370/328 |
| 2016/0255577 A1* | 9/2016 | Kazmi | ............... | H04J 11/00 |
| | | | | 370/311 |
| 2017/0150548 A1* | 5/2017 | Shah | ............... | H04W 76/38 |
| 2019/0045567 A1* | 2/2019 | Wu | ............... | H04W 56/0015 |
| 2019/0149421 A1* | 5/2019 | Jin | ............... | H04W 36/305 |
| | | | | 370/331 |
| 2020/0186318 A1* | 6/2020 | Miao | ............... | H04B 7/0626 |

OTHER PUBLICATIONS

European Search Report dated Jan. 14, 2020 from Application No. PCT/CN2017/118703.
Communication pursuant to Article 94(3) Examination for EP Application 17931828.2 dated Oct. 12, 2020.

* cited by examiner

METHOD OF ACTIVATING AND DEACTIVATING SECONDARY CELL AND TERMINAL DEVICE

CROSS-REFERENCE TO RELATED APPLICATION(S)

This application is a 371 application of International Application No. PCT/CN2017/118703, filed on Dec. 26, 2017, the entire disclosure of which is hereby incorporated by reference.

TECHNICAL FIELD

The present application relates to the communication field, more particularly, to a method of activating and deactivating a secondary cell and a terminal device.

BACKGROUND

According to the protocol regulation of Long Term Evolution (LTE), a terminal device receives a Medium Access Control Element (MAC CE) sent by a network device, the MAC CE can be used for indicating to activate or deactivate a Secondary Cell (SCell) of the terminal device, then the terminal device can activate or deactivate a corresponding SCell according to the MAC CE.

In the New Radio (NR) system, the terminal device can also receive downlink control information (DCI) sent by the network device, the DCI can also indicate the terminal device to activate or deactivate an SCell. Therefore, when the terminal device receives the MAC CE and the DCI, especially when the indications of the MAC CE and the DCI are different, an ambiguity problem occurs, the terminal device cannot determine whether to perform activation or deactivation.

SUMMARY

The present application provides a method of activating and deactivating a secondary cell and a terminal device.

In a first aspect, a method of activating and deactivating a secondary cell is provided, the method includes: a terminal device receives first indication information sent by a network device at a first starting time, the first indication information being used for indicating the terminal device to activate or deactivate a secondary cell of the terminal device; the terminal device receives second indication information sent by the network device at a second starting time, the second indication information being used for indicating the terminal device to activate or deactivate the secondary cell, wherein the second starting time is later than the first starting time, and the terminal device does not accomplish the activation or the deactivation of the secondary cell according to the first indication information at the second starting time; after the second starting time, the terminal device determines to activate or deactivate the secondary cell only according to the first indication information or the second indication information, according to a preset rule.

In combination with the first aspect, in an example of the first aspect, the first indication information is a MAC CE and the second indication information is DCI; or, the first indication information is the DCI and the second indication information is the MAC CE.

In combination with the first aspect and the above example thereof, in another example of the first aspect, the first indication information is used for indicating the terminal device to activate the secondary cell, the second indication information is used for indicating the terminal device to deactivate the secondary cell; or, the first indication information is used for indicating the terminal device to deactivate the secondary cell, the second indication information is used for indicating the terminal device to activate the secondary cell.

In combination with the first aspect and the above example thereof, in another example of the first aspect, the preset rule includes that the terminal device activates or deactivates the secondary cell according to the first indication information. That is, the terminal device does not perform the activation or the deactivation of the secondary cell indicated by the second indication information.

In combination with the first aspect and the above example thereof, in another example of the first aspect, the preset rule includes that the terminal device activates or deactivates the secondary cell according to the second indication information. That is, the terminal device does not perform the activation or the deactivation of the secondary cell indicated by the first indication information.

In combination with the first aspect and the above example thereof, in another example of the first aspect, the method further includes that the terminal device determines to accomplish the activation or the deactivation of the secondary cell indicated by the first indication information before a first end time.

In combination with the first aspect and the above example thereof, in another example of the first aspect, the method further includes that the terminal device determines to accomplish the activation or the deactivation of the secondary cell indicated by the second indication information before a second end time.

In combination with the first aspect and the above examples thereof, in another example of the first aspect, the first indication information is used for indicating the terminal device to accomplish the activation or the deactivation of the secondary cell of the terminal device before a first end time, the second indication information is used for indicating the terminal device to accomplish the activation or the deactivation of a secondary cell of the terminal device before a second end time, the second starting time is earlier than the first end time.

In combination with the first aspect and the above example thereof, in another example of the first aspect, the first end time is earlier than the second end time.

Optionally, the preset rule further includes that the terminal device accomplishes the activation or the deactivation of the secondary cell before the first end time only according to the first indication information. Furthermore, there is no need for the terminal device to perform the activation or the deactivation indicated by the second indication information between the first end time and the second end time. If there is no other indication information for indicating the terminal device to activate or deactivate the secondary cell during this time period, the terminal device will maintain the activation or deactivation state indicated by the first indication information; if there is other indication information, the terminal device activates or deactivates the secondary cell according to the other indication information.

Optionally, the preset rule further includes that the terminal device accomplishes the activation or the deactivation of the secondary cell before the second end time only according to the second indication information. Furthermore, there is no need for the terminal device to perform the activation or the deactivation indicated by the first indication information between the second starting time and the first end time.

In combination with the first aspect and the above example thereof, in another example of the first aspect, the first end time is later than the second end time.

Optionally, the preset rule includes that the terminal device activates or deactivates the secondary cell before the first end time according to the first indication information. Furthermore, there is no need for the terminal device to perform the activation or the deactivation of the secondary cell indicated by the second indication information between the second starting time and the second end time.

Optionally, the preset rule includes that the terminal device activates or deactivates the secondary cell before the second end time according to the second indication information. Furthermore, there is also no need for the terminal device to perform the activation or the deactivation of the secondary cell indicated by the first indication information after the second end time and before the first end time, herein if there is no other indication information used for indicating the terminal device to activate or deactivate the secondary cell within this time period, the terminal device will maintain the activation or deactivation state indicated by the second indication information; if there is other indication information, the terminal device activates or deactivates the secondary cell according to the other indication information.

In a second aspect, a terminal device is provided, used for performing the method of above first aspect or the method in any possible example of the above first aspect. Specifically, the terminal device includes units for executing the method of above first aspect or the method in any possible example of the above first aspect.

In a third aspect, a terminal device is provided, including a storage unit and a processor, the storage unit is used for storing instructions, the processor is used for executing the instructions stored in the memory, and when the processor executes the instructions stored in the memory, the execution causes the processor to execute the method of the first aspect or the method in any possible example of the first aspect.

In a fourth aspect, a computer readable medium is provided, used for storing a computer program, the computer program includes instructions for executing the method of the first aspect or the method in any possible example of the first aspect.

In a fifth aspect, a computer program product including instructions is provided, when a computer runs the instructions of the computer program product, the computer performs the method of activating and deactivating the secondary cell of the above first aspect or the method in any of the possible examples of the above first aspect. Specifically, the computer program product may be run on the terminal device of the above second aspect.

DETAILED DESCRIPTION

Hereinafter, the technical solutions in implementations of the present application will be described with reference to the drawings.

The technical solutions of implementations of the present application may be applied to various communication systems, such as, the Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) or Worldwide Interoperability for Microwave Access (WiMAX) communication system, future Fifth-Generation (5G) system, or New Radio (NR), etc.

The terminal device in implementations of the present application may be referred to a user equipment (UE), access terminal, subscriber unit, subscriber station, mobile station, mobile platform, remote station, remote terminal, mobile equipment, user terminal, terminal, wireless communication equipment, user agent or user apparatus. The terminal device may also be a cellular phone, a cordless phone, a Session Initiation Protocol (SIP) phone, a Wireless Local Loop (WLL) station, a Personal Digital Assistant (PDA), a pedestrian device with a wireless communication function, a computing device or other processing device connected to a wireless modem, an on-board device, a wearable device, a terminal device in a future 5G network, or a terminal device in a future evolving Public Land Mobile Network (PLMN), etc., which is not restricted in implementations of present application.

The network device in implementations of the present application may be a device for communicating with the terminal device, the network device may be a Base Transceiver Station (BTS) in a GSMC system or CDMA system, a NodeB (NB) in a WCDMA system, may further be an evolutional NodeB in an LTE system (eNB or eNodeB), may further be a wireless controller in a scenario of a Cloud Radio Access Network (CRAN), or the network device may be a relay station, an access point, an on-board device, or a wearable device, a network device in the future 5G network or a network device in the future evolved Public Land Mobile Network (PLMN), etc., which is not restricted in implementations of the present application.

Figure 1:
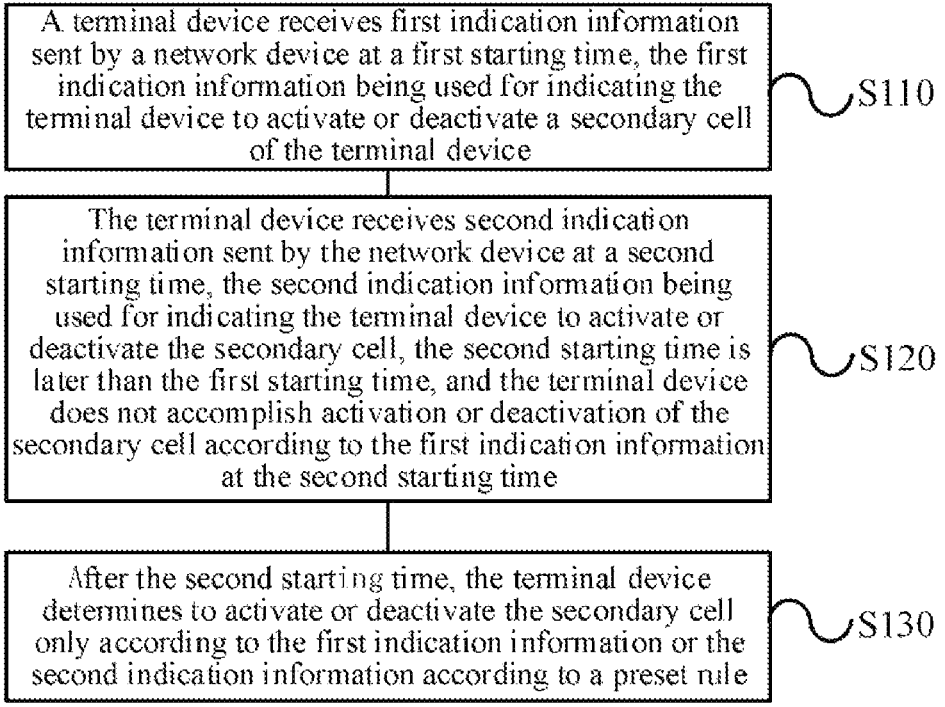
FIG. 1 is a schematic flow chart of a method of activating and deactivating a secondary cell according to an implementation of the present application.

FIG. 1 shows a schematic flow chart of a method 100 of activating and deactivating a secondary cell according to an implementation of the present application, and the method 100 may be performed by a terminal device. As shown in FIG. 1, the method 100 includes: S110, a terminal device receives first indication information sent by a network device at a first starting time, the first indication information being used for indicating the terminal device to activate or deactivate a secondary cell of the terminal device. S120, the terminal device receives second indication information sent by the network device at a second starting time, the second indication information being used for indicating the terminal device to activate or deactivate the secondary cell, herein the second starting time is later than the first starting time, and the terminal device does not accomplish activation or deactivation of the secondary cell according to the first indication information at the second starting time. S130, after the second starting time, the terminal device determines to activate or deactivate the secondary cell only according to the first indication information or the second indication information, according to a preset rule.

It should be understood that the first indication information in the implementation of the present application may be a MAC CE, correspondingly, the second indication information is DCI; or the first indication information may be DCI, correspondingly, the second indication information is a MAC CE. However, the implementation of the present application is not limited thereto.

In the implementation of the present application, the terminal device receives the first indication information sent by the network device at a first starting time n, and the first indication information can be used for indicating the terminal device to activate or deactivate the corresponding secondary cell (SCell). Specifically, the terminal device may also determine a delay with a duration of x for performing activation or deactivation of the SCell according to the first indication information, that is, according to the first indication information, the terminal device needs to activate or deactivate the SCell within the time period from the first starting time n to a first ending time n+x. Optionally, the first indication information can also be used for indicating the terminal device to accomplish activation or deactivation before the first end time n+x, that is, the first indication information indicates that the terminal device has a delay with the duration of x. Optionally, the delay with the duration of x can also be a preset value.

In the implementation of the present application, the terminal device receives the second indication information sent by the network device at a second starting time m, and the second indication information can be used for indicating the terminal device to activate or deactivate the corresponding SCell. Herein, the second starting time m is after the first starting time n, but the second starting time m is before the moment when the terminal device activates or deactivates an SCell according to the first indication information, that is, after receiving the first indication information, the terminal device receives the second indication information before accomplishing activation or deactivation of an SCell according to the first indication information. Specifically, the terminal device may also determine a delay with a duration of y for performing activation or deactivation of an SCell according to the second indication information, that is, according to the second indication information, the terminal device needs to activate or deactivate the SCell within a time period from the second starting time m to the second end time m+y. Optionally, the second indication information may also be used for indicating the terminal device to accomplish activation or deactivation before the second end time m+y, that is, to indicate the terminal device that there is a delay with the duration of y by the second indication information. Optionally, the delay with the duration of y can also be a preset value.

Optionally, after receiving the first indication information and the second indication information successively, the terminal device may determine to activate or deactivate an SCell only according to the first indication information or only according to the second indication information, according to a preset rule, and ignore the other indication information. Optionally, the preset rule can be that the terminal device selects the first indication information, that is, the terminal device activates or deactivates an SCell according to the first indication information without executing the second indication information; or, the preset rule may be that the terminal device selects the second indication information, that is, the terminal device activates or deactivates the SCell according to the second indication information without executing the first indication information.

Optionally, as an implementation, the preset rule is that the terminal device selects the first indication information without executing the second indication information. Specifically, the terminal device receives the first indication information sent by the network device at the first starting time n, activates or deactivates the SCell according to the first indication information. If the terminal device receives second indication information sent by the network device at the second starting time m before the terminal device accomplishes the activation or deactivation of an SCell, there is no need for the terminal device to perform activation or deactivation according to the second indication information, but the terminal still activates or deactivates the SCell according to the first indication information.

It should be understood that the first indication information may further indicate the terminal device to accomplish activation or deactivation before the first end time n+x, or the terminal device determines that activation or deactivation needs to be accomplished before the first end time n+x according to a preset value. Whereas the second indication information further indicates the terminal device to accomplish activation or deactivation before the second end time m+y, or the terminal device determines that activation or deactivation needs to be accomplished before the second end time m+y according to a preset value. Herein when the first end time n+x is earlier than the second end time m+y, the terminal device can further accomplish, in the case of selecting to perform activation or deactivation of the SCell according to the first indication information, activation or deactivation of the SCell before the first ending time n+x, as indicated by the first indication information or determined according to a preset value. Furthermore, after the terminal device accomplishes activation or deactivation of the SCell according to the first indication information, if the terminal device does not receive other indication information of indicating activation or deactivation within the time period after the first end time n+x and before the second end time m+y, which is indicated by the second indication information or determined by the preset value, the terminal device maintains the activation or deactivation state indicated by the first indication information and does not need to execute the second indication information. If the terminal device receives other indication information of indicating activation or deactivation, the terminal device performs activation or deactivation according to the other indication information. However, implementations of the present application are not limited thereto.

When the first end time n+x is later than or equal to the second end time m+y, the terminal device can further accomplish, in the case of performing activation or deactivation of the SCell according to the first indication information, activation or deactivation of the SCell before the first end time n+x, as indicated by the first indication information or determined according to a preset value, that is, the terminal device accomplishes activation or deactivation of the SCell according to the first indication information after the second end time m+y and before the first end time n+x and does not need to execute the second indication information. However, implementations of the present application are not limited thereto.

Optionally, as an implementation, the preset rule is that the terminal device selects the second indication information without executing the first indication information. Specifically, the terminal device receives the first indication information sent by the network device at the first starting time n and the second indication information sent by the network device at the second starting time m, the second starting time m is later than the first starting time n but earlier than the time when the terminal device accomplishes activation or deactivation of the SCell according to the first indication information, the terminal device performs activation or deactivation of the SCell according to the second indication information after the second starting time m, instead of performing activation or deactivation according to the first indication information.

It should be understood that the first indication information may further indicate the terminal device to accomplish activation or deactivation before the first end time n+x, or the terminal device determines that activation or deactivation needs to be accomplished before the first end time n+x according to a preset value. The second indication information further indicates the terminal device to accomplish activation or deactivation before the second end time m+y, or the terminal device determines that activation or deactivation needs to be accomplished before the second end time m+y according to a preset value. Herein when the first end time n+x is earlier than the second end time m+y, the terminal device may further accomplish, in the case of the terminal device performing activation or deactivation the Scell according to the second indication information, activation or deactivation of the SCell before the second end time m+y, as indicated by the second indication information or determined according to a preset value, that is, the terminal device accomplishes, between the second starting time m and the second end time m+y, activation or deactivation of the SCell only according to the second indication information, and does not need to execute the first indication information. However, implementations of the present application are not limited thereto.

When the first end time n+x is later than or equal to the second end time m+y, the terminal device performs, between the second starting time m and the second end time m+y, activation or deactivation of the SCell according to the second indication information, and the terminal device maintains the activation or deactivation state indicated by the second indication information if the terminal device does not receive other indication information of indicating activation or deactivation during the time period after the second end time m+y and before the first end time n+x indicated by the first indication information or determined according to a preset value, and does not need to execute the first indication information. If the terminal device receives other indication information of indicating activation or deactivation, the terminal device performs activation or deactivation according to the other indication information, and still does not need to execute the first indication information. However, implementations of the present application are not limited thereto.

It should be understood that the delay duration x of activating or deactivating an SCell in the first indication information and the delay duration y of activating or deactivating an SCell in the second indication information in the implementation of the present application may include a specific duration for performing activation or deactivation, and the specific duration may be preconfigured for the terminal device by the network device. Optionally, if the first indication information or the second indication information is a MAC CE, the delay duration x or y may further include a delay from the control channel to the data channel. Optionally, the delay duration x or y may further include other delays. However, implementations of the present application are not limited thereto.

It should be understood that the first indication information in the implementation of the present application may be used for indicating the terminal device to activate or deactivate an SCell, the second indication information may also be used for indicating the terminal device to activate or deactivate an SCell, and the content of the first indication information may be the same as or different from the content of the second indication information. For example, the first indication information is used for indicating the terminal device to activate an SCell, and the second indication information is used for indicating to deactivate an SCell. Or, the first indication information is used for indicating the terminal device to activate an SCell, the second indication information is also used for indicating activation of an SCell. However, implementations of the present application are not limited thereto.

It should be understood that the SCell in the implementation of the present application may include the SCell of a primary base station corresponding to the terminal device or the SCell of a secondary base station. However, implementations of the present application are not limited thereto.

It should be understood that when the terminal device accomplishes activation or deactivation of an SCell, the terminal device may further send Channel State Information (CSI) to the network device to indicate that the terminal device has activated or deactivated the SCell. However, implementations of the present application are not limited thereto.

Therefore, in the method of activating and deactivating the secondary cell in an implementation of the present application, when the terminal device receives two pieces of indication information for indicating activation or deactivation of the secondary cell, the terminal device can select one of the two pieces of indication information to perform activation or deactivation according to a preset rule, thus avoiding the ambiguity problem caused when the terminal device receives conflictive indication information, enabling the terminal device to correctly perform activation or deactivation of the secondary cell.

It should be understood that in various implementations of the present disclosure, the values of the sequence numbers in the above processes do not mean the order of execution, the order of execution of various processes should be determined by its function and internal logic, and should not constitute any limitation on the execution process of the implementations of the present disclosure.

The term "and/or" in this document is merely an association relationship describing an associated object, indicating that there may be three relationships, for example, A and/or B may indicate three situations: A alone, A and B, and B alone. In addition, the symbol "/" in this document generally indicates that objects of the former and the latter connected by "/" has an "or" relationship.

The method of activating and deactivating a secondary cell according to an implementation of the present application is described in detail above with reference to FIG. 1. The terminal device according to an implementation of the present application will be described below with reference to FIGS. 2 to 3.

Figure 2:
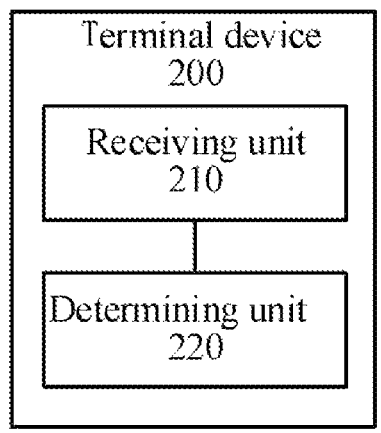
FIG. 2 is a schematic block diagram of a terminal device according to an implementation of the present application.

As shown in FIG. 2, the terminal device 200 according to the implementation of the present application includes a receiving unit 210 and a determining unit 220. Specifically, the receiving unit 210 is used for receiving first indication information sent by a network device at a first starting time, the first indication information being used for indicating the terminal device to activate or deactivate a secondary cell of the terminal device. The receiving unit 210 is further used for receiving second indication information sent by the network device at a second starting time, the second indication information being used for indicating the terminal device to activate or deactivate the secondary cell. Herein the second starting time is later than the first starting time, and the terminal device does not accomplish activation or deactivation of the secondary cell according to the first indication information at the second starting time. The determining unit 220 is used for determining to activate or deactivate the secondary cell only according to the first indication information or the second indication information after the second starting time, according to a preset rule.

Optionally, the first indication information is a MAC CE, and the second indication information is DCI; or, the first indication information is the DCI, and the second indication information is the MAC CE.

Optionally, the first indication information is used for indicating the terminal device to activate the secondary cell, and the second indication information is used for indicating the terminal device to deactivate the secondary cell.

Optionally, the first indication information is used for indicating the terminal device to deactivate the secondary cell, and the second indication information is used for indicating the terminal device to activate the secondary cell.

Optionally, the preset rule includes that the terminal device activates or deactivates the secondary cell according to the first indication information, and the terminal device does not perform activation or deactivation indicated by the second indication information.

Optionally, the preset rule includes that the terminal device activates or deactivates the secondary cell according to the second indication information, and the terminal device does not perform the activation or deactivation indicated by the first indication information.

Optionally, the first indication information is used for indicating the terminal device to accomplish activation or deactivation of a secondary cell of the terminal device before a first end time, the second indication information is used for indicating the terminal device to accomplish activation or deactivation of the secondary cell of the terminal device before a second end time, the second starting time is earlier than the first end time.

Optionally, the first end time is earlier than the second end time, or the first end time is later than the second end time.

It should be understood that the terminal device 200 according to the implementation of the present application may correspondingly perform the method 100 in the implementation of the present application, and the above and other operations and/or functions of each unit in the terminal device 200 are respectively for realizing each corresponding flow of the terminal device of the method in FIG. 1, and will not be repeated here for the sake of brevity.

Therefore, for the terminal device of the implementation of the present application, when receiving two pieces of indication information for indicating activation or deactivation of a secondary cell, the terminal devices can select one of the two pieces of indication information to perform activation or deactivation according to a preset rule, thus avoiding the ambiguity problem caused by receiving conflictive indication information, enabling the terminal device to correctly perform activation or deactivation of the secondary cell.

Figure 3:
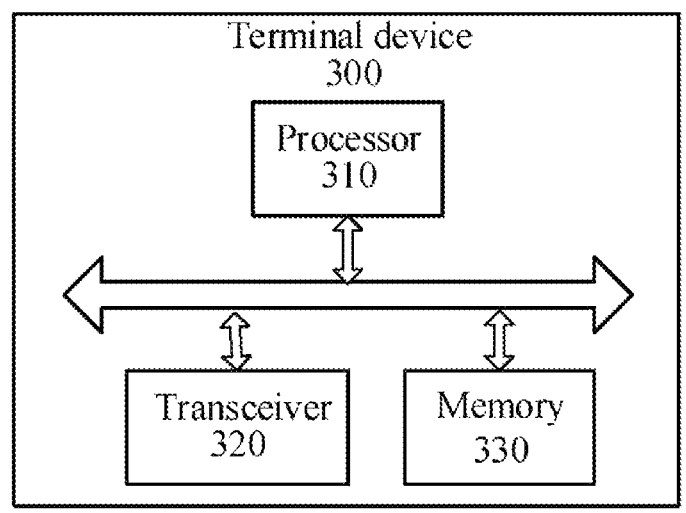
FIG. 3 is another schematic block diagram of a terminal device according to an implementation of the present application.

FIG. 3 shows a schematic block diagram of a terminal device 300 according to an implementation of the present application. As shown in FIG. 3, the terminal device 300 includes a processor 310 and a transceiver 320, and the processor 310 is connected to the transceiver 320. Optionally, the terminal device 300 further includes a memory 330, and the memory 330 is connected to the processor 310. Herein, the processor 310, the memory 330 and the transceiver 320 communicate with each other through an internal connection path to transfer and/or control data signals. The memory 330 can be used for storing instructions. The processor 310 is used for executing the instructions stored in the memory 330 to control the transceiver 320 to send information or signals. The transceiver 320 is used for receiving first indication information sent by a network device at a first starting time, and the first indication information is used for indicating the terminal device to activate or deactivate a secondary cell of the terminal device. The transceiver 320 is further used for receiving second indication information sent by the network device at a second starting time, and the second indication information is used for indicating the terminal device to activate or deactivate the secondary cell. Herein the second starting time is later than the first starting time, and the terminal device does not accomplish activation or deactivation of the secondary cell according to the first indication information at the second starting time. The processor 310 is used for determining to activate or deactivate the secondary cell only according to the first indication information or the second indication information after the second starting time, according to a preset rule.

Optionally, as an implementation, the first indication information is a MAC CE, the second indication information is DCI; or, the first indication information is the DCI, the second indication information is the MAC CE.

Optionally, as an implementation, the first indication information is used for indicating the terminal device to activate the secondary cell, and the second indication information is used for indicating the terminal device to deactivate the secondary cell.

Optionally, as an implementation, the first indication information is used for indicating the terminal device to deactivate the secondary cell, and the second indication information is used for indicating the terminal device to activate the secondary cell.

Optionally, as an implementation, the preset rule includes that the terminal device activates or deactivates the secondary cell according to the first indication information, and the terminal device does not perform the activation or deactivation indicated by the second indication information.

Optionally, as an implementation, the preset rule includes that the terminal device activates or deactivates the secondary cell according to the second indication information, and the terminal device does not perform the activation or deactivation indicated by the first indication information.

Optionally, as an implementation, the first indication information is used for indicating the terminal device to accomplish activation or deactivation of the secondary cell of the terminal device before a first end time, the second indication information is used for indicating the terminal device to accomplish activation or deactivation of the secondary cell of the terminal device before a second end time, and the second starting time is earlier than the first end time.

Optionally, as an implementation, the first end time is earlier than the second end time, or the first end time is later than the second end time.

It should be understood that the terminal device 300 according to the implementation of the present application may correspond to the terminal device 200 in the implementation of the present application and may correspond to a relevant body that performs the method 100 according to the implementation of the present application, and the above and other operations and/or functions of each unit in the terminal device 300 are respectively for realizing each corresponding flow of the terminal device in the method shown in FIG. 1, and will not be repeated here for the sake of brevity.

Therefore, when receiving two pieces of indication information for indicating activation or deactivation of a secondary cell, the terminal device of the implementation of the present application can select one of the two pieces of indication information to perform activation or deactivation according to a preset rule, thus avoiding the ambiguity problem caused by receiving conflictive indication information, enabling the terminal device to correctly perform activation or deactivation of the secondary cell.

It should be noted that the above method implementations of the present application can be applied to or implemented by a processor. The processor may be an integrated circuit chip with signal processing capability. In the execution process, the acts of the method implementations described above may be accomplished by integrated logic circuits of hardware in the processor or instructions in the form of software. The above processor may be a general purpose processor, a Digital Signal Processor (DSP), an Application Specific Integrated Circuit (ASIC), a Field Programmable Gate Array (FPGA) or other programmable logic devices, discrete gate or transistor logic devices, and discrete hardware components, which may implement methods, acts and logic block diagrams disclosed in implementations of the present disclosure. The general purpose processor may be a microprocessor or the processor may be any conventional processor or the like. The acts of the method disclosed in connection with the implementation of the present application can be directly embodied by the execution of the hardware decoding processor or by the combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the acts of the above method in combination with its hardware.

It should be understood that the memory in implementations of the present application may be a transitory memory or non-transitory memory, or may include both transitory and non-transitory memory. The nonvolatile memory may be Read-Only Memory (ROM), Programmable Rom (PROM), Erasable PROM (EPROM), Electrically Erasable EPROM (EEPROM), or Flash memory. The transitory memory may be a Random Access Memory (RAM) which serves as an external cache. By illustration of example but not restriction, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but not limited to, these and any other suitable types of memories.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art can clearly understand that for convenience and conciseness of description, the specific working processes of the system, device and unit described above may refer to the corresponding processes in the above method implementations and will not be described here.

In several implementations provided by the present application, it should be understood that the disclosed systems, devices and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate unit may or may not be physically separated, and the unit shown as a unit may or may not be a physical unit, i.e., it may be located in one place or may be distributed over multiple network units. Some or all of the elements can be selected according to actual needs to achieve the purpose of the implementations.

In addition, various functional units in various implementations of the present disclosure may be integrated in one processing unit, or they may be physically present in each unit alone, or two or more units may be integrated in one unit.

The functions may be stored in a computer readable storage medium if implemented in the form of software functional units and sold or used as separate products. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present application. The aforementioned storage media include U disk, mobile hard disk, read-only memory, random access memory, magnetic disk or optical disk, and other media capable of storing program codes.

What are described above are merely exemplary implementations of the present application, but the protection scope of the present disclosure is not limited thereto. Any change or substation that can be easily conceived by a person skilled in the art within the technical scope disclosed by the present application shall be included within the protection scope of the present application. Therefore, the protection scope of the present application shall be the protection scope defined by the claims.

What we claim is:

1. A method of activating and deactivating a secondary cell, comprising:
   receiving, by a terminal device, first indication information sent by a network device at a first starting time, the first indication information being used for indicating the terminal device to accomplish activation or deactivation of a secondary cell of the terminal device before a first end time;
   receiving, by the terminal device, second indication information sent by the network device at a second starting time, the second indication information being used for indicating the terminal device to accomplish the activation or the deactivation of the secondary cell before a second end time, wherein the second starting time is later than the first starting time and earlier than the first end time, and the terminal device does not accomplish the activation or the deactivation of the secondary cell according to the first indication information at the second starting time; and after the second starting time, determining, by the terminal device, to activate or deactivate the secondary cell only according to the first indication information or the second indication information, according to a preset rule, wherein the preset rule comprises activating or deactivating, by the terminal device, the secondary cell according to one of the first indication information or the second indication information, and not performing, by the terminal device, the activation or the deactivation of the secondary cell indicated by the other one of the first indication information or the second indication information, and wherein an indication by the first indication information is different from an indication by the second indication information.

2. The method of claim 1, wherein the first indication information is a medium access control (MAC) control element (CE), and the second indication information is downlink control information (DCI); or
the first indication information is the DCI, and the second indication information is the MAC CE.

3. The method of claim 1, wherein the first indication information is used for indicating the terminal device to activate the secondary cell, and the second indication information is used for indicating the terminal device to deactivate the secondary cell; or
the first indication information is used for indicating the terminal device to deactivate the secondary cell, and the second indication information is used for indicating the terminal device to activate the secondary cell.

4. The method of claim 1, wherein the first end time is earlier than the second end time, or the first end time is later than the second end time.

5. A terminal device, comprising a memory, a transceiver, and a processor, wherein the memory is used for storing instructions, the processor is used for executing the instructions stored in the memory, and when the processor executes the instructions stored in the memory, the processor is caused to:

control the transceiver to receive first indication information sent by a network device at a first starting time, the first indication information being used for indicating the terminal device to accomplish activation or deactivation a secondary cell of the terminal device before a first end time;

control the transceiver to receive second indication information sent by the network device at a second starting time, the second indication information being used for indicating the terminal device to accomplish the activation or the deactivation of the secondary cell before a second end time, wherein the second starting time is later than the first starting time and earlier than the first end time, and the terminal device does not accomplish the activation or the deactivation of the secondary cell according to the first indication information at the second starting time; and determine to activate or deactivate the secondary cell only according to the first indication information or the second indication information after the second starting time, according to a preset rule, wherein the preset rules comprises activating or deactivating, by the terminal device, the secondary cell according to one of the first indication information or the second indication information, and not performing, by the terminal device, the activation or the deactivation of the secondary cell indicated by the other one of the first indication information or the second indication information, and wherein an indication by the first indication information is different from an indication by the second indication information.

6. The terminal device of claim 5, wherein the first indication information is a medium access control (MAC) control element (CE), and the second indication information is downlink control information (DCI); or, the first indication information is the DCI, and the second indication information is the MAC CE.

7. The terminal device of claim 5, wherein the first indication information is used for indicating the terminal device to activate the secondary cell, and the second indication information is used for indicating the terminal device to deactivate the secondary cell; or, the first indication information is used for indicating the terminal device to deactivate the secondary cell, and the second indication information is used for indicating the terminal device to activate the secondary cell.

8. The terminal device of claim 5, wherein the first end time is earlier than the second end time, or the first end time is later than the second end time.

9. The terminal device of claim 6, wherein the first indication information is used for indicating the terminal device to activate the secondary cell, and the second indication information is used for indicating the terminal device to deactivate the secondary cell; or, the first indication information is used for indicating the terminal device to deactivate the secondary cell, and the second indication information is used for indicating the terminal device to activate the secondary cell.

10. The terminal device of claim 6, wherein the preset rule comprises:
activating or deactivating, by the terminal device, the secondary cell according to the first indication information, and not performing, by the terminal device, the activation or the deactivation of the secondary cell indicated by the second indication information.

11. The terminal device of claim 7, wherein the preset rule comprises:
activating or deactivating, by the terminal device, the secondary cell according to the first indication information, and not performing, by the terminal device, the activation or the deactivation of the secondary cell indicated by the second indication information.

12. The terminal device of claim 6, wherein the preset rule comprises:
activating or deactivating, by the terminal device, the secondary cell according to the second indication information, and not performing, by the terminal device, the activation or the deactivation of the secondary cell indicated by the first indication information.

13. A non-transitory computer readable medium, storing a computer program comprising instructions which, when being executed by a computer, causes the computer to:
receive first indication information sent by a network device at a first starting time, the first indication information being used for indicating a terminal device to accomplish activation or deactivation of a secondary cell of the terminal device before a first end time;

receive second indication information sent by the network device at a second starting time, the second indication information being used for indicating the terminal device to accomplish the activation or the deactivation of the secondary cell before a second end time, wherein the second starting time is later than the first starting time and earlier than the first end time, and the terminal device does not accomplish the activation or the deactivation of the secondary cell according to the first indication information at the second starting time; and determine to activate or deactivate the secondary cell only according to the first indication information or the second indication information after the second starting time, according to a preset rule, wherein the preset rule comprises activating or deactivating, by the terminal device, the secondary cell according to one of the first indication information or the second indication information, and not performing, by the terminal device, the activation or the deactivation of the secondary cell indicated by the other one of the first indication information or the second indication information, and wherein an indication by the first indication information is different from an indication by the second indication information.

* * * * *